US009692283B2

(12) United States Patent
Ponzio et al.

(10) Patent No.: US 9,692,283 B2
(45) Date of Patent: Jun. 27, 2017

(54) APPARATUS AND METHOD FOR FORMING COIL MEMBERS

(71) Applicant: ATOP S.P.A., Barberino Val d'Elsa (IT)

(72) Inventors: Massimo Ponzio, Tavernelle Val di Pesa (IT); Rubino Corbinelli, Staggia Senese (IT)

(73) Assignee: ATOP S.p.A, Barberino Val d'Elsa (IT)

( * ) Notice: Subject to any disclaimer, the term of this patent is extended or adjusted under 35 U.S.C. 154(b) by 0 days.

(21) Appl. No.: 15/124,025

(22) PCT Filed: Mar. 2, 2015

(86) PCT No.: PCT/EP2015/054254
§ 371 (c)(1),
(2) Date: Sep. 6, 2016

(87) PCT Pub. No.: WO2015/132180
PCT Pub. Date: Sep. 11, 2015

(65) Prior Publication Data
US 2017/0019003 A1    Jan. 19, 2017

(30) Foreign Application Priority Data
Mar. 7, 2014 (IT) .............................. TO2014A0184

(51) Int. Cl.
*B23P 17/04* (2006.01)
*H02K 15/04* (2006.01)

(52) U.S. Cl.
CPC ................................ *H02K 15/0421* (2013.01)

(58) Field of Classification Search
CPC .......... H02K 15/0421; Y10T 29/49002; Y10T 29/4902; Y10T 29/49071; Y10T 29/49073
(Continued)

(56) References Cited

U.S. PATENT DOCUMENTS 2,476,744 A    7/1949  Leece
4,052,783 A   10/1977  Shively
(Continued)

FOREIGN PATENT DOCUMENTS

EP    1041702 A2    10/2000
EP    1043828 A2    10/2000
(Continued)

OTHER PUBLICATIONS

Search Report and Written Opinion, completed Nov. 8, 2011, for IT TO2011A000199.
(Continued)

*Primary Examiner* — Donghai D Nguyen
(74) *Attorney, Agent, or Firm* — Cooley LLP

(57) ABSTRACT

The invention relates to an apparatus and process for manufacturing coil members (20) to be inserted in the slots (21) of the core of a dynamo electric machine, the coil members (20) being formed by bending portions of an electric conductor (300) using at least a first engagement member (112). The apparatus comprises: a first member (23) that rotates around a first axis of rotation (17a); a second member (24) that rotates around a second axis of rotation (18a) positioned laterally with respect to the first axis of rotation (17a), wherein the second member (24) is supported by the first member (23); a third member (25) rotating around a central axis of rotation of the second member (24); wherein the third member (25) being supported by the second member (24). The first engagement member (112) being capable of engaging the conductor (300) against a contrast surface (192) to bend a portion of the conductor. The rotations of the first member (23) and of the second member (24) cause the at least a first engagement member (112) to move in a plane (P), whilst the rotation of the third member (25) causes the at least a first engagement member (112) to rotate in the
(Continued)

plane (P). Preferably, the rotation of a fourth member (26) causes the at least a first engagement member (112) to rotate out of the plane (P).

17 Claims, 9 Drawing Sheets

(58) Field of Classification Search
USPC ... 29/592.1, 596, 602.1, 605, 606, 732, 735, 29/736; 72/307, 380, 387
See application file for complete search history.

(56) References Cited

U.S. PATENT DOCUMENTS

| | | | |
|---|---|---|---|
| 5,586,384 | A | 12/1996 | Newman |
| 6,782,600 | B2 | 8/2004 | Yamazaki |
| 7,370,401 | B2 | 5/2008 | Stratico |
| 7,480,987 | B1 * | 1/2009 | Guercioni .......... H02K 15/0421 29/592.1 |
| 8,555,694 | B2 * | 10/2013 | Saito .......... B21D 7/02 72/307 |
| 9,479,033 | B2 * | 10/2016 | Ponzio .......... H02K 15/0421 |
| 2002/0017585 | A1 | 2/2002 | Haruta |
| 2003/0137207 | A1 | 7/2003 | Tamura et al. |
| 2003/0159270 | A1 | 8/2003 | Kato |
| 2003/0233748 | A1 | 12/2003 | Gorohata |
| 2004/0040142 | A1 | 3/2004 | Hirota |
| 2005/0236509 | A1 | 10/2005 | Burch |
| 2008/0148794 | A1 | 6/2008 | Patterson |
| 2009/0249853 | A1 | 10/2009 | Young |
| 2010/0325875 | A1 | 12/2010 | Ponzio |

FOREIGN PATENT DOCUMENTS

| | | |
|---|---|---|
| EP | 1304789 A1 | 4/2003 |
| EP | 1328059 A2 | 7/2003 |
| EP | 1372242 A2 | 12/2003 |
| EP | 1376816 A2 | 1/2004 |
| EP | 1727260 A2 | 11/2006 |
| EP | 1043828 B1 | 9/2009 |
| FR | 2845536 A1 | 4/2004 |
| GB | 1 496 445 | 12/1977 |
| WO | WO 2011/004100 A2 | 1/2011 |
| WO | WO 2012/156066 A2 | 11/2012 |
| WO | WO 2013/190860 A1 | 12/2013 |

OTHER PUBLICATIONS

Search Report and Written Opinion, completed Feb. 2, 2012, for IT TO2011A000435.
International Search Report and Written Opinion, mailed Apr. 5, 2012, for International Application No. PCT/EP2012/000633.
International Preliminary Report on Patentability, dated Sep. 10, 2013, for International Application No. PCT/EP2012/000633.
International Search Report and Written Opinion, mailed Jan. 23, 2013, for International Application No. PCT/EP2012/002055.
International Preliminary Report on Patentability, dated Nov. 28, 2013, for International Application No. PCT/EP2012/002055.
International Search Report and Written Opinion, mailed Jun. 19, 2015, for International Application No. PCT/EP2015/054254.

* cited by examiner

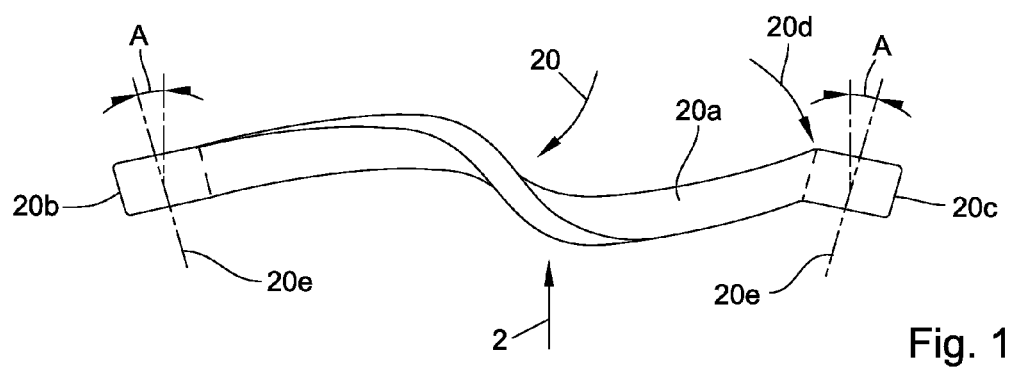
Fig. 1
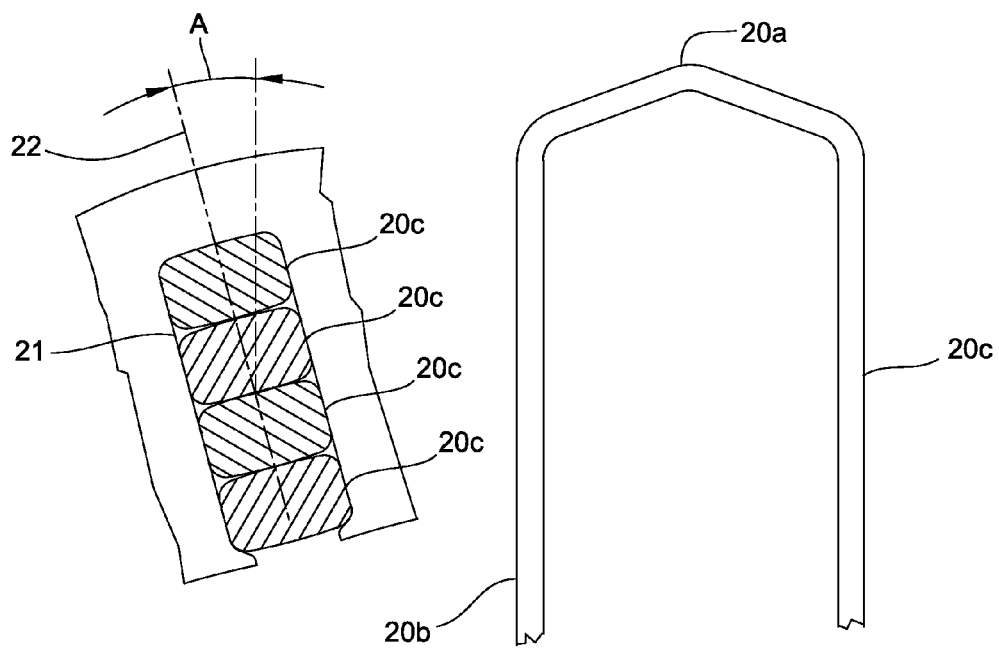
Fig. 2a
Fig. 2
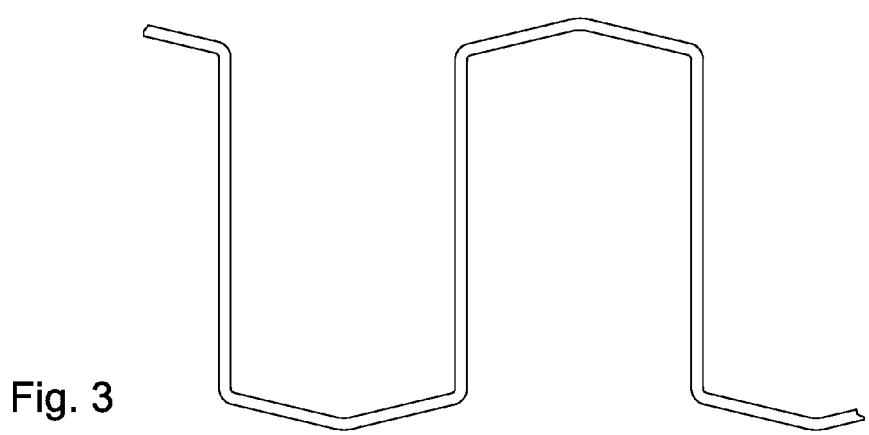
Fig. 3

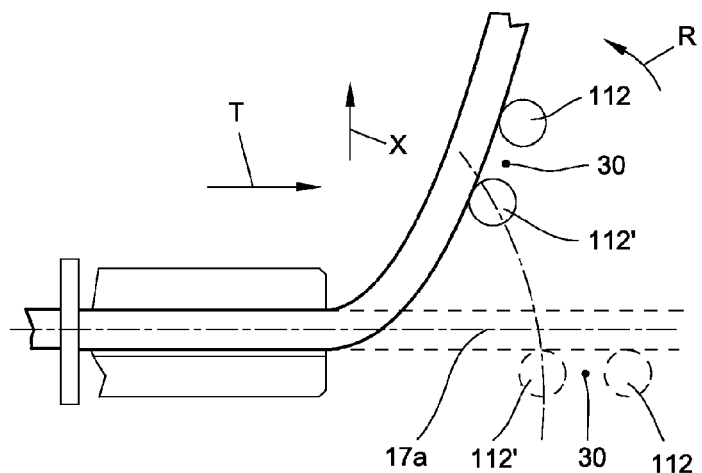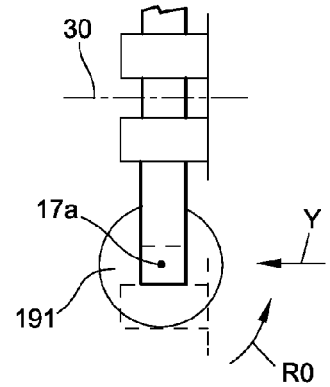
Fig. 13     Fig. 13a
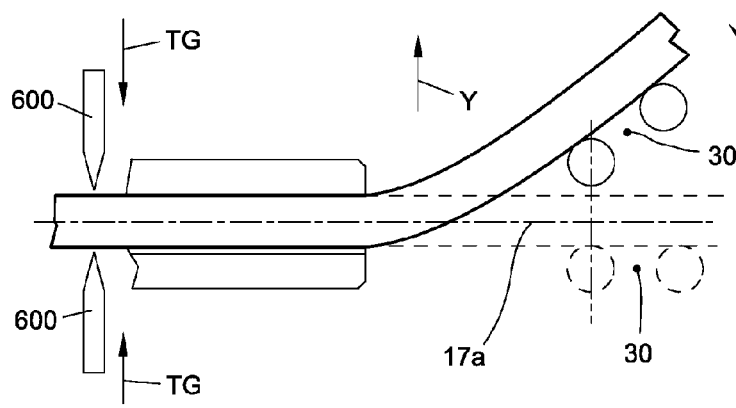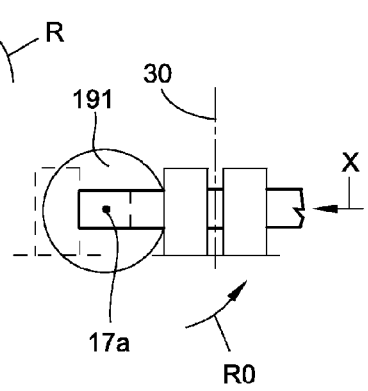
Fig. 14     Fig. 14a
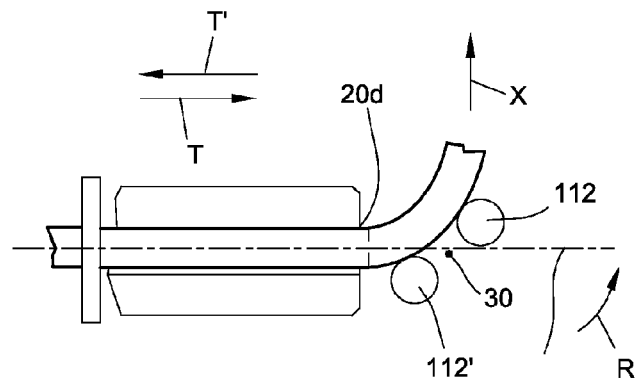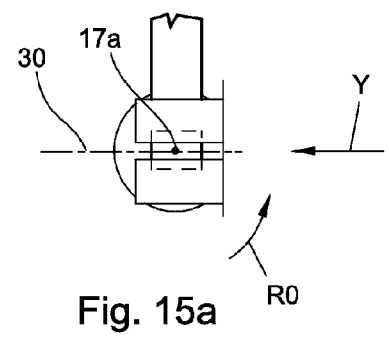
Fig. 15     Fig. 15a

APPARATUS AND METHOD FOR FORMING COIL MEMBERS

CROSS REFERENCE TO RELATED APPLICATIONS

This application claims priority to International Patent Application No. PCT/EP2015/054254, filed Mar. 2, 2015, which claims priority to Italian Patent Application No. TO2014A000184, filed Mar. 7, 2014. The present application incorporates herein by reference the disclosures of each of the above-referenced applications in their entireties.

BACKGROUND OF THE INVENTION

The present invention relates to apparatuses and methods for producing coil members. More specifically the present invention relates to an apparatus and a method for forming coil members of dynamo electric machines by bending electric conductors.

The coil members can be used in stators of electric motors or electric generators. Solutions in this field have been described in PCT Application WO having publication number WO 2012/156066.

The coil members formed with the present invention can have a fork like shape, or other shapes, for example an undulated configuration. Normally, the electric conductor has a relatively large cross section that allows the formed coil member to be self-supporting, i.e. the shape of the coil member is permanently formed according to a specific geometric configuration, which does not change until considerable bending forces are applied. The coil members having the fork like shape are commonly called "hairpins". A further shape, like the undulated configuration, is described in European publication EP 1372242.

A typical processing sequence involving formed hairpins can foresee: insertion of specific hairpins in respective slots of the core of the dynamoelectric machine, bending end portions of the hairpins that extend beyond an end of the core of the dynamoelectric machine, welding together predetermined ends of the hairpin that have become adjacent as a result of the previous bending operation. PCT Application having publication number WO 2012/119691 describes operations of this type and solutions for accurate alignment of ends of the hairpins that need to be welded together.

Bending to form a coil member requires repetitive steps of feeding predetermined lengths of an electric conductor in alignment with a bending tool, like is described in the above mentioned PCT Application WO having publication number 2012/156066. During the feeding steps, a bending tool engages the electric conductor and performs predetermined movements to cause permanent bending into a required shape of the electric conductor.

A cutting operation is performed to free a formed coil member from the rest of the electric conductor, so that the latter can be successively fed to form further coil members. Operations according to these principles have been described in the above mentioned PCT Application having publication number WO2012/156066.

SUMMARY OF THE INVENTION

An object of the present invention is to provide an improved bending method and an apparatus that is capable of automatically forming coil members by bending an electric conductor using a bending tool having predetermined movements with respect to the electric conductor.

Another object of the present invention is to provide a method and apparatus, which is capable of automatically forming a coil member by bending an electric conductor using a bending tool having programmable movements.

Still another object of the present invention is to provide a method and apparatus, which is capable of automatically forming a coil member by bending an electric conductor using a bending tool having precision movements with respect to the electric conductor.

Another object of the present invention is to provide a method and apparatus, which is capable of automatically forming a coil member by bending an electric conductor using a bending tool having rapid movements with respect to the electric conductor in order to reduce the cycle time required to form a coil member.

Another object of the present invention is to provide a method and apparatus, which is capable of automatically forming a coil member by bending an electric conductor using a bending tool having a large range of movements in order to form a variety of shapes of the coil members.

Other features and advantages of the present invention will become apparent from the following description and drawings.

BRIEF DESCRIPTION OF THE DRAWINGS

FIG. 1 is a perspective view of a coil member corresponding to a hairpin configuration having a rectangular cross section, which can be manufactured using the solutions of the present invention.

FIG. 2 is a view as seen from direction 2 of FIG. 1.

FIG. 2a is a partial view similar to the view of FIG. 1 showing a partially filled slot of a core of a dynamoelectric machine.

FIG. 3 is a view similar to the view of FIG. 2 showing a coil member having an undulated configuration.

FIGS. 12-16 are partial section views according to a schematic representations similar to the view of FIG. 5 with the omission of certain parts for reasons of clarity.

FIGS. 12a-16a are partial section views according to a schematic representations similar to the view of FIG. 11, with the omission of certain parts for reasons of clarity.

DETAILED DESCRIPTION OF THE INVENTION

Figure 4:
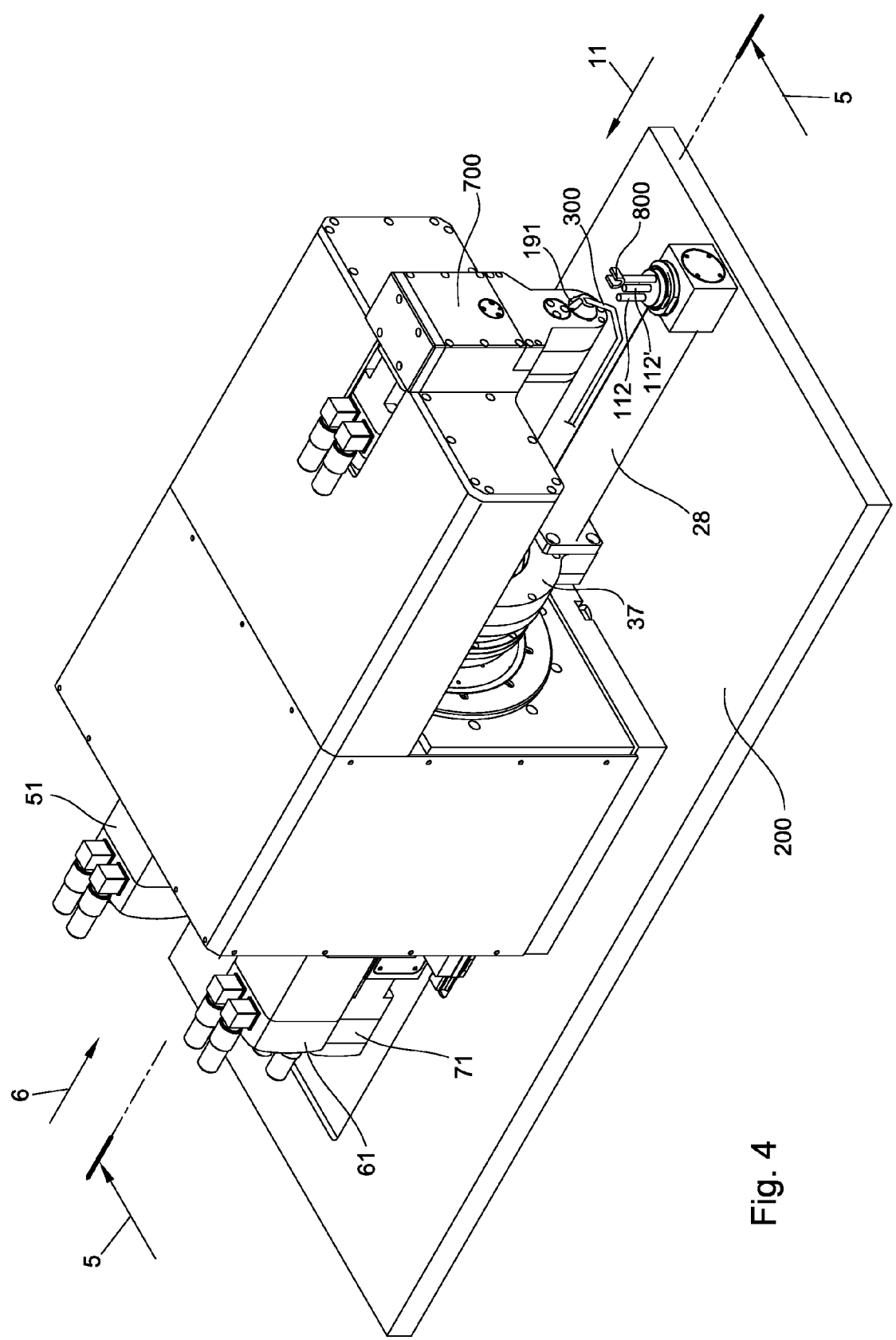
FIG. 4 is a perspective view of a portion of a coil member forming machine in accordance with this invention, as viewed from the end of the forming machine where the coil member is formed and dispensed.

The coil member 20 of FIG. 1 corresponds to a hairpin manufactured with the solutions of the present invention from an electric conductor 300 having a rectangular cross section. As shown in FIGS. 1 and 2, the hairpin is provided with leg portions 20b and 20c, which are substantially straight and a head portion 20a. A torsion portion 20d causes the leg portions to be oriented by angle A, so that axes 20e of the leg portions 20'b and 20c result aligned with the radial axis 22 of a core slot 21 (for example a stator core slot, as shown in FIG. 2a) where leg portions 20c are completely inserted.

The coil member (without numbering) of FIG. 3 has an undulated configuration, which can be obtained with the solutions of the present invention, as will become more apparent from the following.

The perspective view of FIG. 4 shows an example of two engagement members 112 and 112' for bending the electric conductor 300 that can be fed from nozzle 191. In FIG. 4, a partially formed hairpin is shown in a position extending from nozzle 191, whilst the engagement members 112 and 112' are not represented in a condition of alignment with the electric conductor 300 to cause bending, for reasons of clarity.

Clearly, in more simplified embodiments of the present invention a single engagement member can be foreseen instead of the pair of bending members 112, 112', which are illustrated purely as an example in the drawings.

Figure 5:
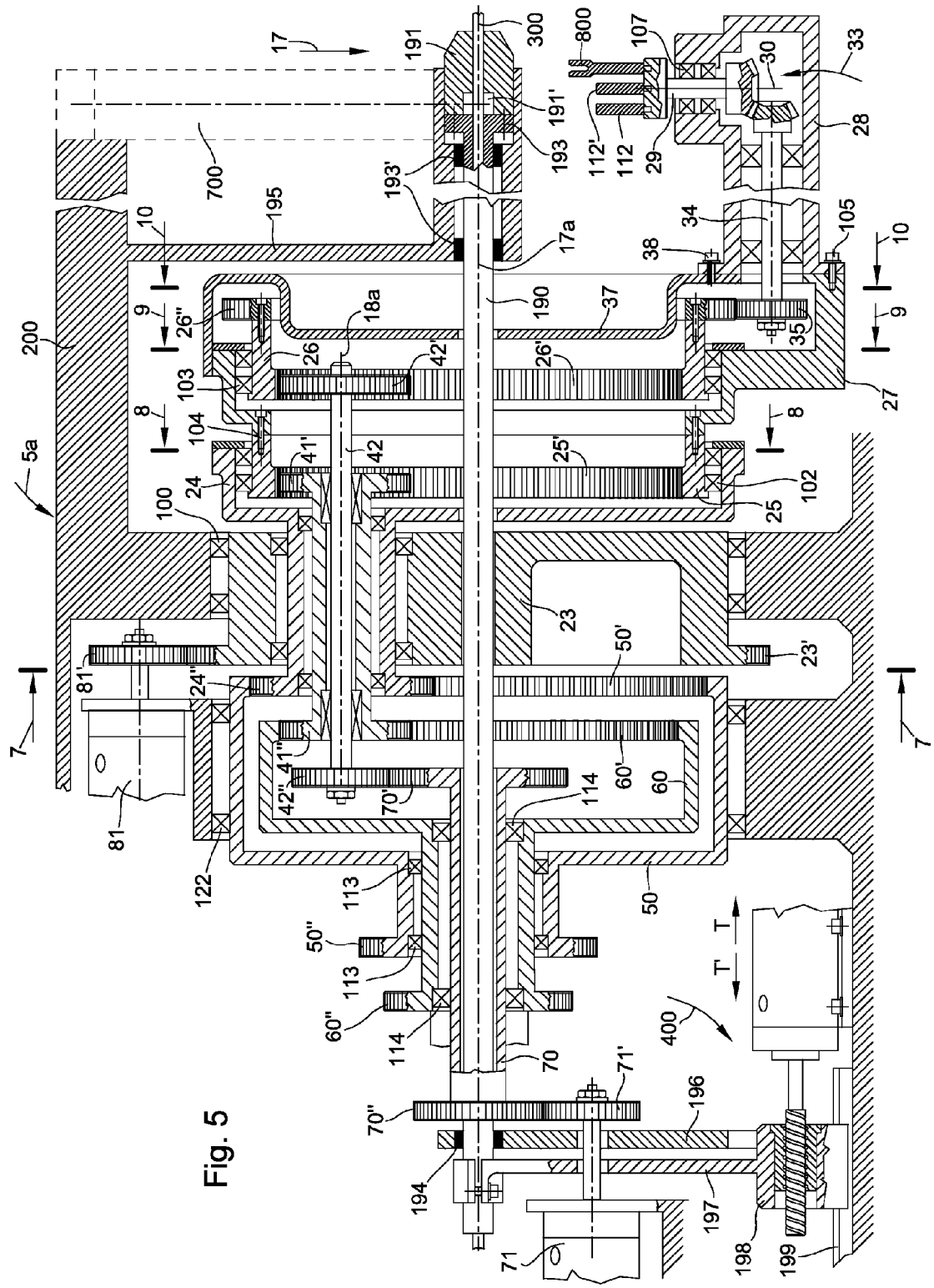
FIG. 5 is a partial section elevation view. The view of FIG. 5 corresponds to a longitudinal middle section of the coil member forming machine of FIG. 4, i.e. as seen from directions 5-5 of FIG. 4.
Figure 5A:
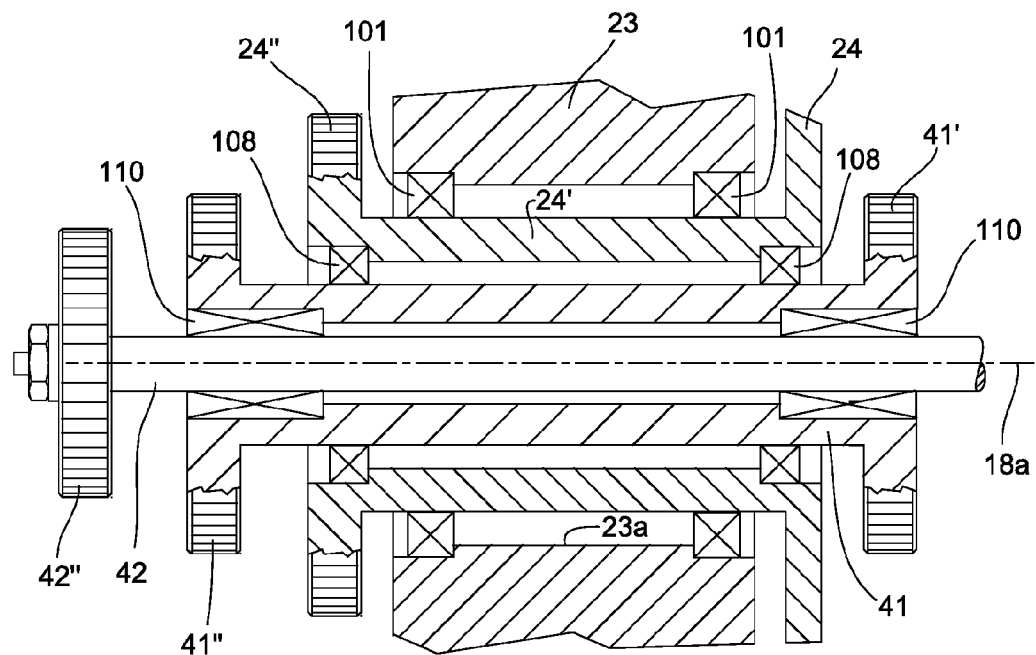
FIG. 5a is an enlarged view of area 5a of FIG. 5, with the omission of certain parts for reasons of clarity.
Figure 7:
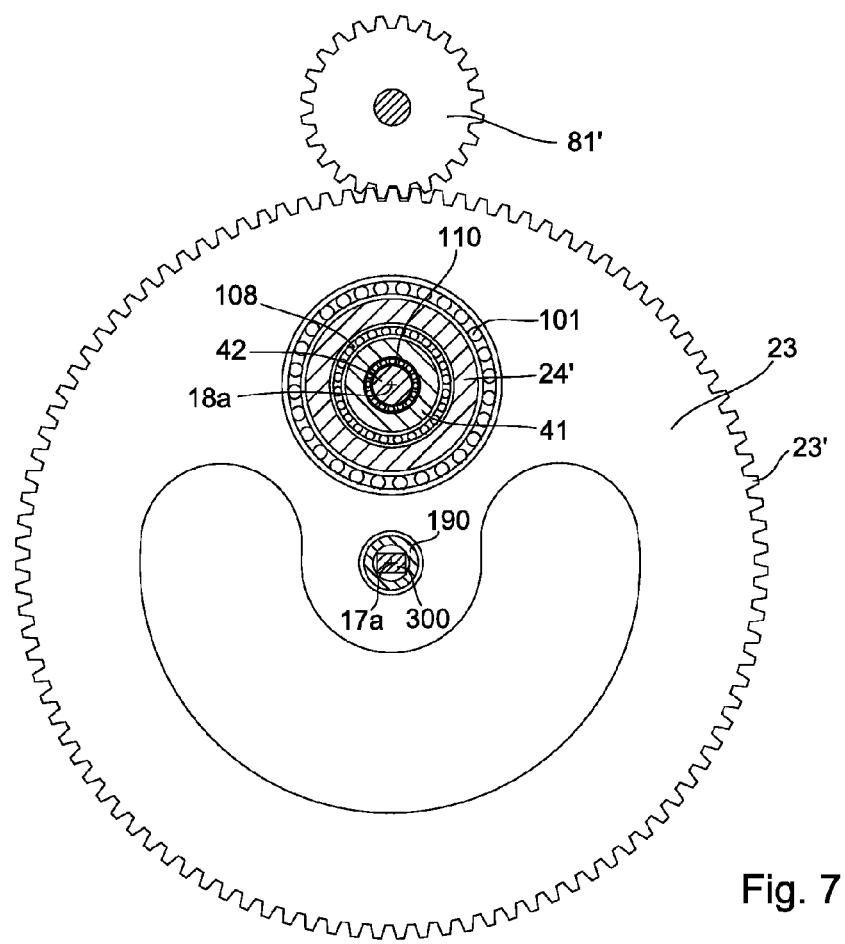
FIG. 7 is a partial section view from directions 7-7 of FIG. 5, with certain parts omitted for reasons of clarity.

With reference to FIGS. 5, 5a and 7 an apparatus is shown for forming coil members according to an embodiment of the present invention.

In particular, a first member 23 is shown, preferably having a cylindrical form, assembled on bearings 100 to rotate around a first axis 17a, along which electric conductor 300 is fed to reach and pass through the center of nozzle 191. According to the embodiment illustrated in the present description, a first member 23 is shown configured with the form of a disk with an eccentric bore 23a, or a passage having a central axis 18a.

Figure 8:
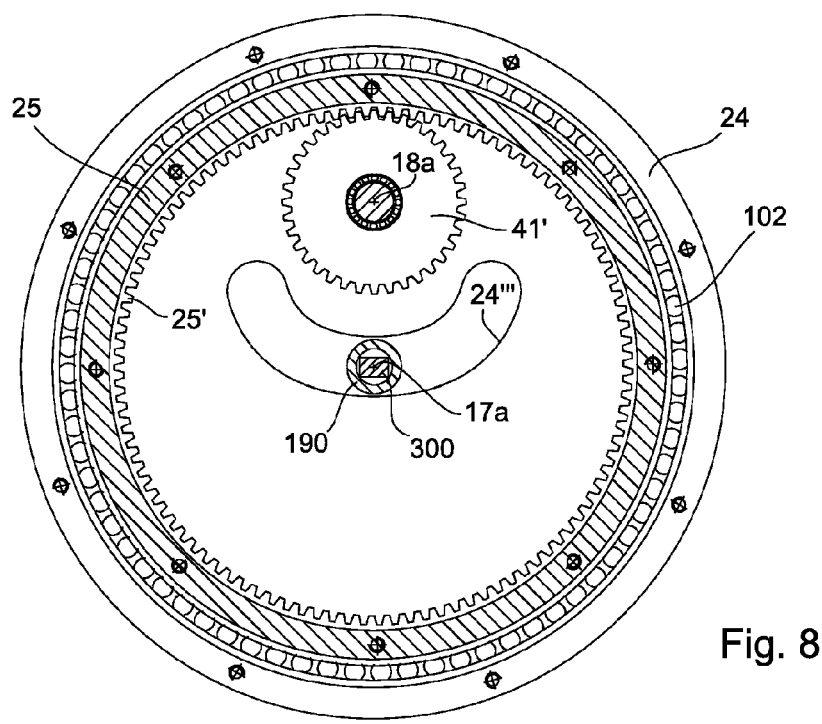
FIG. 8 is a partial section view as seen from directions 8-8 of FIG. 5, with the omission of certain parts for reasons of clarity.

A second member 24 preferably partially having a cup form, like is shown in FIGS. 5, 5a and 8, is assembled to rotate around second axis 18a. More particularly with reference to FIG. 5a, a portion 24' of second member 24 is assembled on bearings 101, which are assembled in bore 23a of first member 23.

Second axis 18a is displaced to one side with respect to first axis 17a; in particular the first axis 17a and the second axis 18a are parallel to each other, as shown in FIGS. 5 and 7.

With this arrangement, second member 24 results supported for rotation on first member 23 around second axis 18a, and is capable of rotating together with first member 23, when the latter rotates around first axis 17a.

With particular reference to FIGS. 5-8, a third member 25, for example having a cylindrical annular form, is assembled on bearings 102, which are mounted to be centered on second member 24. With this arrangement, third member 25 can rotate around a central axis (without numbering) of second member 24.

Figure 10:
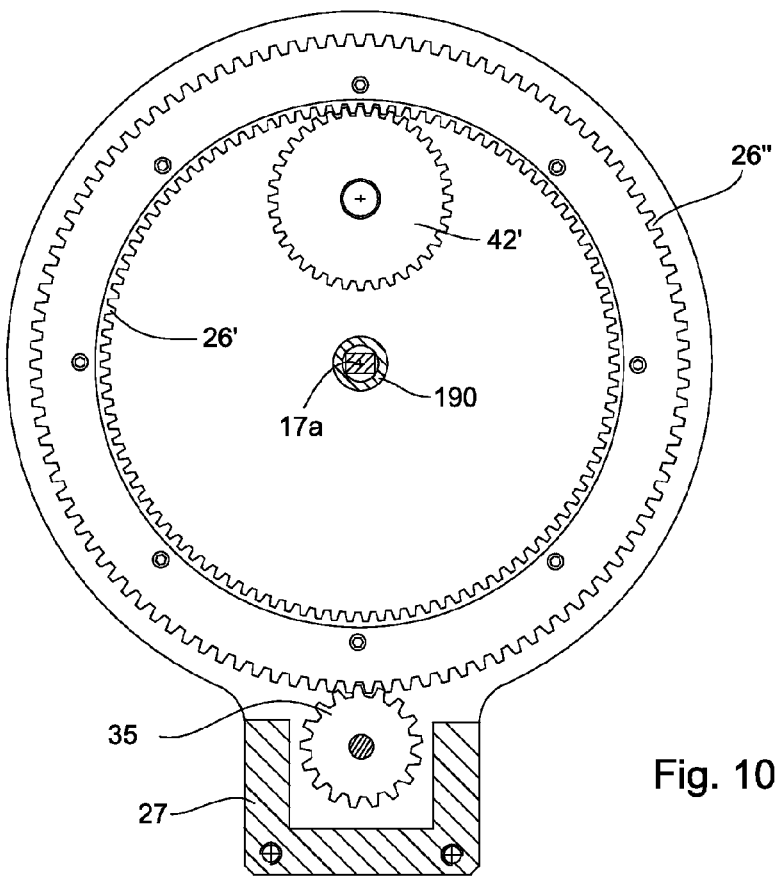
FIG. 10 is a partial section view as seen from directions 10-10 of FIG. 5, with the omission of certain parts for reasons of clarity.

The view of FIG. 10 has been obtained by removing cover member 37, whose presence is facultative, and which would otherwise have obstructed the view of a fourth member 26. As will become apparent from the following description, the use of the fourth member 26 is advantageous although optional for the application of the present invention.

Figure 9:
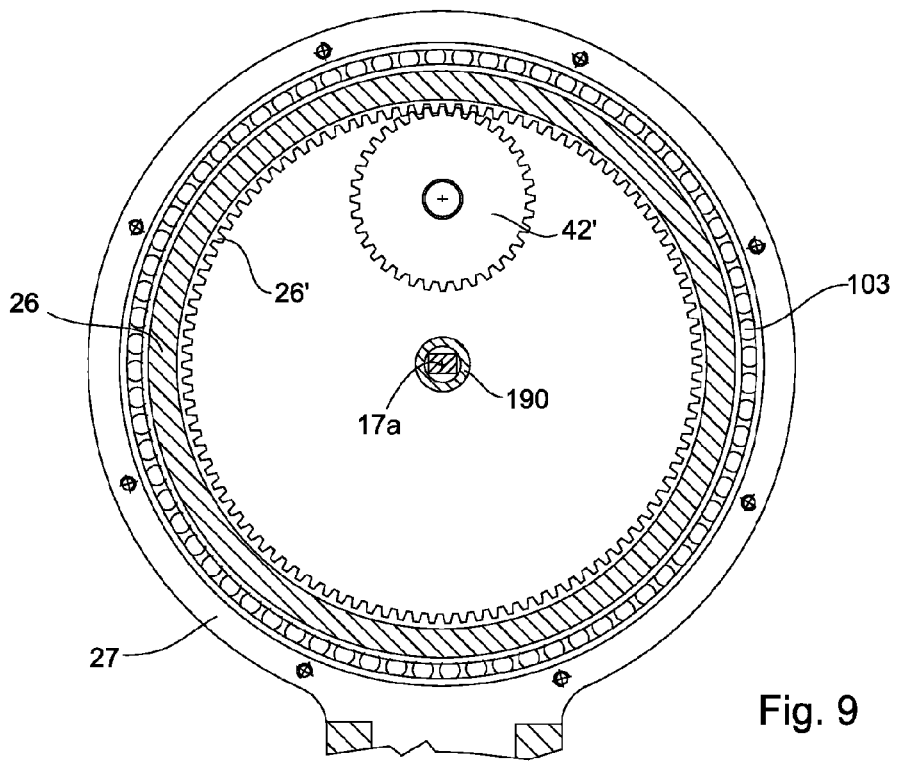
FIG. 9 is a partial section view as seen from directions 9-9 of FIG. 5, with the omission of certain parts for reasons of clarity.

With particular reference to the embodiment of FIGS. 5, 9 and 10, fourth member 26, preferably having a cylindrical annular form, is assembled on bearings 103. Bearings 103 are mounted for example on an extension member 27 of third member 25 in order to rotate around a central axis of second member 24. More particularly, extension member 27 is fixed to third member 25 by means of bolts 104, as shown in FIG. 5.

An arm structure 28 is preferably fixed to extension member 27 by means of bolts 105, as shown in FIG. 5.

In the shown embodiment, engagement members 112 and 112' are part of a support member 29. Support member 29 is assembled on bearings 107 of arm structure 28 in order to rotate around third axis 30, which can be perpendicular to first axis 17a, as shown in FIG. 5.

In the shown embodiment, a conical tooth transmission transmits rotation to support member 29, thereby transmitting rotation R to engagement members 112 and 112'. Conical tooth transmission 33 is such that it can be rotated by shaft 34, which is in turn rotated by gear 35. Gear 35 is engaged with toothed portion 26" of fourth member 26, as shown in FIGS. 5 and 10.

In the shown embodiment, cover member 37 is secured to arm structure 28 by means of bolts referenced 38. Furthermore, cover member 37 is secured to member 27 by bolts (not shown) positioned around bearings 103, as shown in FIG. 5. In particular, cover member 37 has an aperture positioned centrally to allow passage of a shaft 190. Cover member 37 has the function of impeding accidental access to the front of the apparatus shown in FIGS. 4 and 5.

In the shown embodiment, the third member 25 is rotated by movement means, which as an example can comprise an end 41' that has teeth engaged with third member 25, as shown in FIG. 5. End 41' can be rotated for example by a motor 61.

The transmission exiting from bore 23a will be described with particular reference to FIGS. 5 and 5a. More particularly, a tubular member 41 is assembled on bearings 108, which are in turn assembled in portion 24' of second member 24. End 41' of tubular member 41, which is toothed, is engaged with toothed portion 25' present on the periphery of third member 25, as shown in FIGS. 5 and 8. Thus, tubular member 41 is part of a transmission means, capable of rotation around axis 18a, which passes through first member 23 in order to rotate third member 25.

With reference to figures, 5 and 5a, and still considering bore 23a as part of the transmission means, a shaft member 42 is assembled on bearings 110, which are assembled in the bore 23a of tubular member 41. One end of shaft member 42 has a toothed pinion 42' engaged with toothed portion 26' present on the periphery of fourth member 26, as shown in FIGS. 5, 9 and 10.

Figure 6:
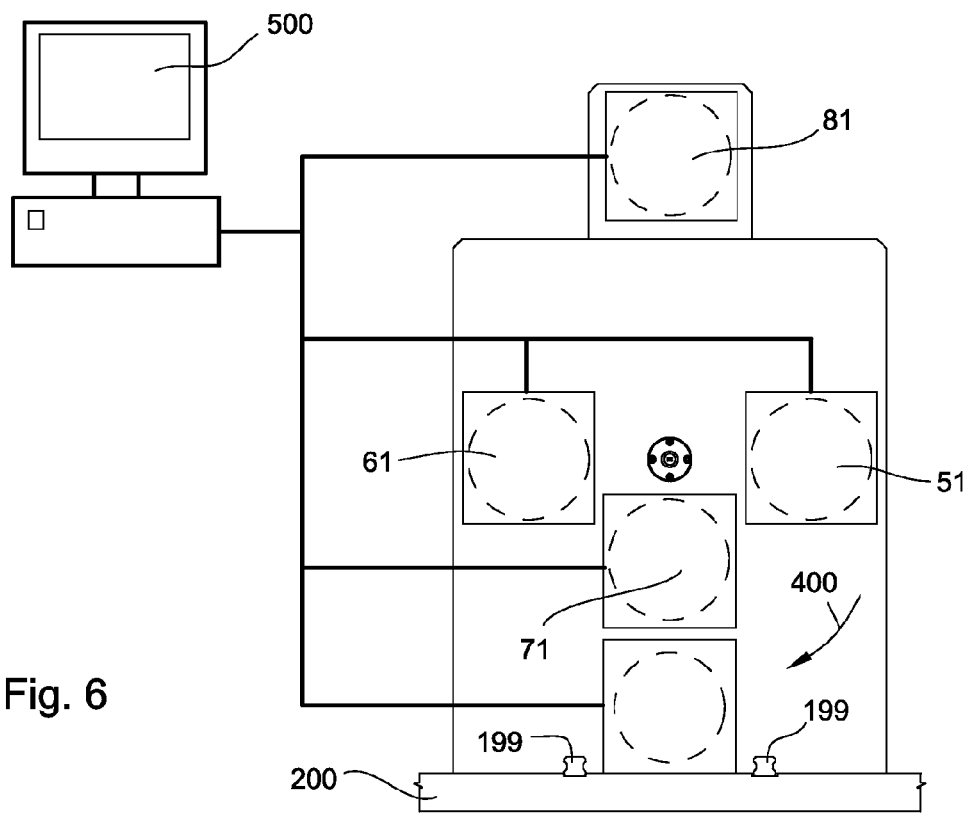
FIG. 6 is a schematic view, as seen from direction 6 of FIG. 4, with certain parts omitted for reasons of clarity.

With reference to FIGS. 5, 5a and 6, the second member 24 can be driven in rotation, for example by movement means, which in the shown embodiment comprise a toothed portion 50'. The toothed portion 50' is engaged with the second member 24 and can be rotated for example by a motor 51.

In particular, a first drive member 50 is provided with the above mentioned toothed portion 50' engaged with toothed portion 24" of second member 24.

Preferably, the toothed portion 50' can be a toothed crown having internal teeth, whilst the toothed portion 24" of the second member 24 can be a disk provided with external teeth engaged with the above mentioned internal teeth.

In particular, first drive member 50 is also provided with toothed portion 50''' engaged with a gear (not shown) of motor 51. More particularly, the toothed portion 50''' can be a crown having external teeth, which engage with the above mentioned gear of motor 51.

Preferably, first drive member 50 is supported for rotation on bearings 122, which are mounted on frame 200. With this arrangement, rotation of motor 51 rotates second member 24 around second axis 18*a*.

FIG. 8 shows that second member 24 is provided with a slot 24''' for passage of shaft 190 to allow the central axis of second member 24 to move with respect to first axis 17*a* and first member 23, as will be more fully described with reference to FIG. 11. Furthermore, third member 25 and fourth member 26 are preferably annular, as shown in FIGS. 5, 9 and 10, so that they can rotate around the central axis of second member 24 without interfering with shaft 190, which remains aligned with first axis 17*a*.

With reference to FIG. 5, second drive member 60 is provided with toothed portion 60' engaged with toothed portion 41" of tubular member 41, as shown in FIG. 5. Preferably, the toothed portion 60' is a crown having internal teeth, whilst the toothed portion 41" is a disk provided with external teeth engaged with the above mentioned internal teeth.

In particular, the second drive member 60 is also provided with toothed portion 60" engaged with a gear (not shown) of motor 61. More particularly, the toothed portion 60" can be a crown having external teeth, which engage with the above mentioned gear of motor 61.

Preferably, second drive member 60 is supported for rotation on bearings 113, which are mounted on first drive member 50. In this example, rotation of motor 61 rotates third member 25 around a central axis of second member 24 by rotating tubular member 41, which passes though bore 23*a* of first member 23.

With reference to FIG. 5, third drive member 70 is provided with toothed portion 70' engaged with toothed portion 42" of shaft member 42, as shown in FIG. 5. Preferably, the toothed portion 70" is a disk provided with external teeth, whilst the toothed portion 42" is a further disk provided with external teeth engaged with teeth of toothed portion 70".

In particular, third drive member 70 is also provided with toothed portion 70''' engaged with gear 71' of motor 71. More particularly, the toothed portion 70''' is a disk having external teeth, which engage with the above mentioned gear 71' of motor 71.

Preferably, third drive member 70 is supported for rotation on bearings 114, which are mounted on second drive member 60. According to this arrangement, rotation of motor 71 rotates fourth member 26 around a central axis of second member 24 by rotating shaft member 42, which passes through bore 23*a* of first member 23.

With reference to FIGS. 5 and 7, the first member 23 is driven for rotation by other movement, which in the illustrated embodiment comprise a motor 81 capable of cooperating with the above mentioned first member 23.

In particular the periphery of first member 23, which is provided with a toothed portion 23', is engaged by gear 81' of motor 81. Bearings 100 on which first member 23 is mounted are supported by frame 200, as shown in FIG. 5. According to this example, first member 23 can be rotated around axis 17*a* by motor 81.

By rotating third member 25 around a central axis of second member 24, extension member 27 and arm structure 28, which are fixed to third member 25, as described in the foregoing, are caused to rotate for same amounts of rotation of third member 25 around the central axis of second member 24. According to this example, engagement members 112 and 112' are also caused to rotate for same amounts of rotation of third member 25 around the central axis of second member 24.

Figure 11:
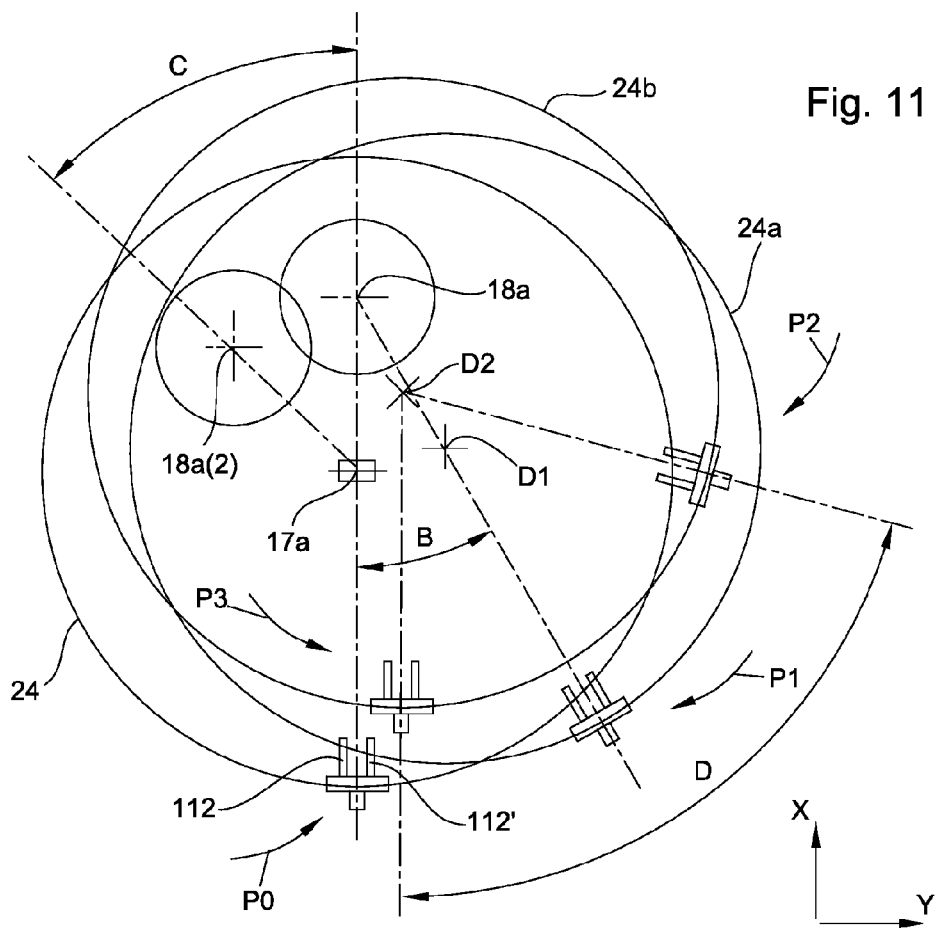
FIG. 11 is a view from direction 11 of FIG. 4 illustrating movements of a bending tool according to a schematic representation.

FIG. 11 illustrates according to a schematic representation positions and movements of engagement members 112 and 112' obtained by stages of rotation of first member 23, second member 24 and third member 25 in a plane P. Plane P can be considered to be at 90 degrees with respect to first axis 17*a*. For reasons of clarity, in plane P of FIG. 11, engagement members 112 and 112' are rotated by 90° around axis 30 with respect to the orientation that engagement members 112 and 112' have in FIGS. 4 and 5

With reference to FIG. 11, a rotation of angle B of second member 24 around second axis 18*a*, produced by rotating motor 51, will displace engagement members 112 and 112' from position P0 to position P1. This will cause the central axis of second member 24 to move (from the position corresponding with the first axis 17*a*) to position D1, and that the new position of the contour of second member 24 will be 24*a*.

In position P1, engagement members 112 and 112' have a new orientation with respect to an absolute reference like X, Y of the plane P, as shown in FIG. 11. A rotation of angle C of first member 23 around first axis 17*a*, produced by rotating motor 81, will displace engagement members 112 and 112' (from position P1) to position P2 . After the rotation of angle C, second axis 18*a* is in a new position 18*a* (2) aligned with position P2, as shown in FIG. 11. Furthermore, the central axis of second member 24 will be moved (from position D1) to position D2 and the new position of the contour of second member 24 will be 24*b*. In position P2, engagement members 112 and 112' have another orientation with respect to absolute reference X, Y.

A rotation of angle D of third member 25 around the central axis (positioned in position D2) of second member 24, can reorient engagement members 112 and 112' to have the same orientation of position P0 and to be in position P3, which is displaced by a certain distance in directions X and directions Y from position P0.

In other words, by rotating the first member 23 and the second member 24 the engagement members 112 and 112' or in other examples, the single engagement member) can be displaced in plane P, by accomplishing two rotations according to the described embodiment. In this way the engagement members 112 and 112' can be located the desired coordinates X, Y in plane P.

However, in this embodiment if only the first member and the second member 24 are rotated the angular orientation of the first member 23 and the second member 24 in plane could not be obtained according to desired values.

In fact, in this case the angular orientation of the engagement members 112 and 112' would depend on the kinematic cooperation accomplished by the first member 23 and the second member 24. The kinematic cooperation would obtain an angular orientation of the engagement members 112 and 112' which is predetermined and function of the reached coordinates X,Y. In this condition, by rotating the third member 25, the engagement members 112 and 112' can be further rotated in plane P, thereby allowing the variation of the angular orientation of the engagement members 112 and 112', which is instead imposed by the combined rotation of the first member 23 and the second member 24. The combination of the rotations of the first member 23, the second member 24, and the third member 25 defines the coordinates X,Y and the angular orientation of the engagement members 112 and 112' thereby positioning them as desired.

If engagement members 112 and 112' are required to move directly from a condition like that of position P0 to a condition like that of position P3, then rotations of first member 23, second member 24 and third member 25 can be accomplished according to predetermined laws of motion, which are synchronized and occurring simultaneously. To achieve this, motors 81, 61, and 51 will be actuated accordingly by signal lines and power lines of controls 500, as shown in FIG. 6.

According to the described embodiment, when the rotations of the first member 23 and the second member 24 and the third member 25 are mutually synchronized and substantially simultaneous, they can advantageously accomplish a displacement of the engagement members 112 and 112' in plane P, and the single rotations of engagements members 112 and 112' are not separate or subdivided in strictly sequential stages. On the contrary the displacement can appear like a single movement, continuous and homogenous accomplished in plane P and deriving from the superposition of the rotation simultaneously caused to the engagement members 112 and 112' by the rotations of the members 23, 24 and 25.

The previous description with reference to FIG. 11 illustrates that the intersection of second axis 18a and the center of second member 24 move in plane P. In this example it is fundamental to have a slotted aperture 24''' on second member 24 for avoiding interference between shaft 190 and second member 24, when the latter is rotating around axis 18a. Slot 24''' has been described in the foregoing with reference to FIG. 8.

In the described embodiment, the electric conductor 300 that needs to be bent by being engaged either with one of engagement members 112 and 112', or with both of engagement members 112 and 112' is fed through shaft 190 and dispensing nozzle 191. A surface 192 for contrasting the bending action of engagement members 112 and 112' can correspond to a side of the exit of dispensing nozzle 191, as will be more fully described in the following. Solutions for feeding the electric conductor 300 though shaft 190 can be like those described in the above mentioned PCT Application having publication number 2012/156066.

With particular reference to FIG. 5, dispensing nozzle 191 is connected to shaft 190 through flange 193. In particular, shaft 190 extends through the fourth member 26, the third member 25, the second member 24 and the first member 23, as shown in FIGS. 5-10.

Preferably, shaft 190 is hollow and centered on axis 17a of the first member 23. Shaft 190 is supported on bushings 193' and 194 respectively of support portions 195 and 196 of frame 200. Arm 197 is fixed to the end of shaft 190, as shown in FIG. 5. Arm 197 is part of slide 198, which can translate in direction T and T' by being supported on guides 199.

In the described embodiment, a motor unit 400 is foreseen having a screw drive, as shown in FIG. 5, for translating slide 198 in directions T and T'. These translations result in translating dispensing nozzle 191 in direction T and T' with respect to engagement members 112 and 112'.

By using the movements described with reference to FIG. 11 of the first member 23, the second member 24, the third member 25 together with the translation of nozzle 191 in directions T or T', it is possible to position and move engagement member 112 and 112' as shown in FIGS. 8-12 and FIGS. 8a-12a of International application WO 2012/156066. These figures are herewith included, respectively, with the numbering FIGS. 12-16 and FIGS. 12a-16a. In the present description, the reference numbering of these figures taken from the above mentioned International application WO 2012/156066 has been changed to conform to the embodiment of the present invention. Furthermore, some of the details have been omitted for reasons of clarity.

It is possible to obtain the various bends of conductor 300 being fed through shaft 190 and nozzle 191 in order to form, for example, the hairpin configuration, or the undulated configurations shown in FIGS. 1, 2 and 3.

Figures 12, 12A:
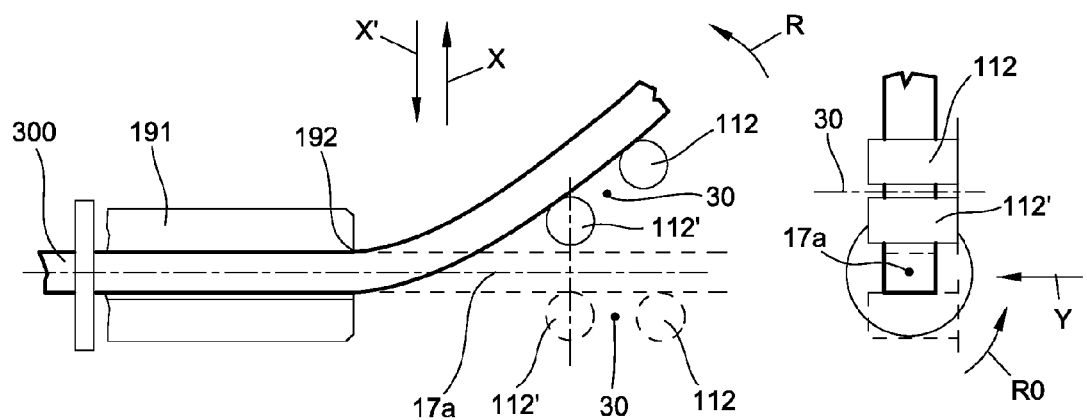
Figures 16, 16A:
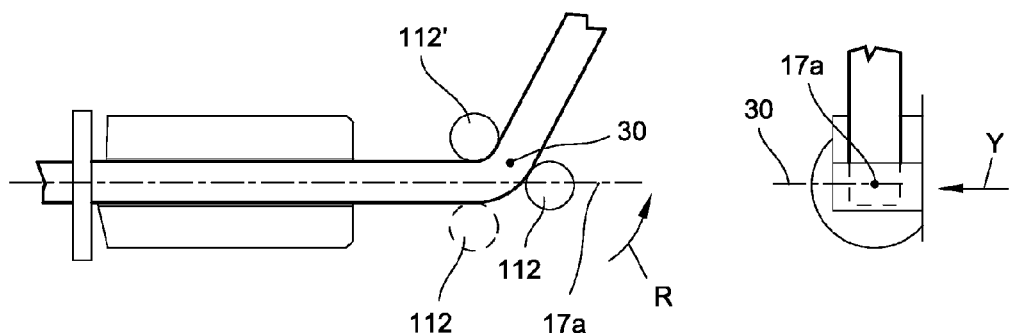

With reference to FIGS. 12 and 12a, which are views in the plane of FIG. 5 and respectively in a plane perpendicular to the plane of FIG. 5, a bend is being obtained on conductor 300 by engagement of both engagement members 112 and 112', and the contrast reaction by the surface 192. More particularly, engagement members 112 and 112' have been rotated in direction R around axis 30 by rotating fourth member 26. Also, with reference to FIG. 12a, engagement members 112 and 112' have been rotated in direction RO around first axis 17a by rotating third member 25. Furthermore, engagement members 112 and 112' have been moved in direction X and Y by rotating first member 23, second member 24 and third member 25.

With reference to FIGS. 13 and 13a, which are also views respectively in the plane of FIG. 5, and respectively in a plane perpendicular to the plane of FIG. 5, a "sharper" bend is obtained on conductor 300 by engagement with engagement members 112 and 112', and the contrast reaction of surface 192. In this case, dispensing member 190 has been moved nearer to engagement members 112 and 112', and therefore surface 192 has become nearer to engagement members 112 and 112'. Then, rotations in directions R and RO and translations in directions X and Y of engagement members 112 and 112' can be obtained, like has been described previously with reference to FIGS. 12 and 12a.

With reference to FIGS. 14 and 14a, FIG. 14 is a view perpendicular to the view of FIG. 5, whilst FIG. 14a is a view perpendicular to FIG. 14. In FIG. 14, cutting members 600 have been shown moving in directions TG to cut the conductor 300 in order to free the formed coil member.

In the described embodiment, cutting members 600 can be actuated by motorized unit 700, which is shown in FIG. 4, and also shown with dashed line representation in FIG. 5. For example, the cutting members 600 straddle over dispensing member 191, and can pass through apertures 191' provided on opposite sides of dispensing member 191, as shown in FIG. 5, to reach and cut conductor 300.

FIGS. 15 and 15a and 16 and 16a are views like those of FIGS. 12 and 12a, showing further situations of movement and engagement of engagement members 112 and 112' and of the contrast reaction by the surface 192, which can be obtained by combing rotations of first member 23, second member 24, third member 25, fourth member 26 and translations of nozzle 191 in directions T and T'.

Figure 17:
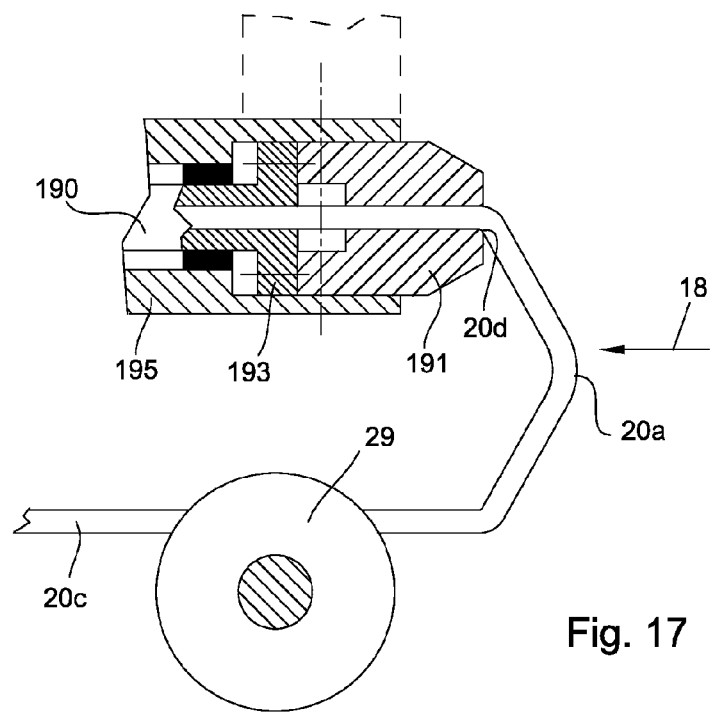
FIG. 17 is a partial view of a portion of FIG. 5 during a specific bending operation, as seen from direction 17 of FIG. 5.
Figure 18:
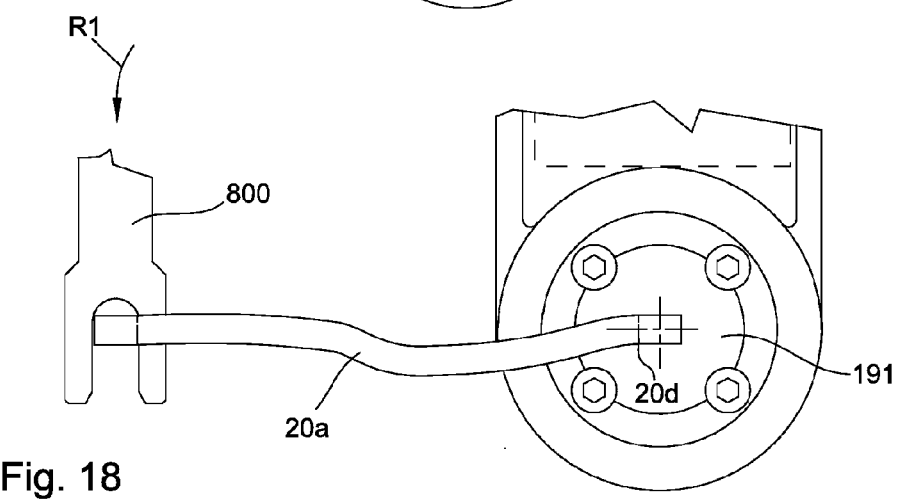
FIG. 18 is a view from direction 18 of FIG. 17.

FIGS. 17 and 18 shows a situation where torsion means, which in the described embodiment comprise for example a fork member 800 optionally provided on support member 29 (see also FIG. 5). In this example, the fork member 800 has been aligned with a leg portion 20c of conductor 300 extending from dispensing nozzle 191 in a stage of forming a hairpin configuration. Following this alignment, fork member 800 can be rotated around the dispensing member 191 in direction R1 by rotating with drive means, which in the described example comprise the third member 25. This creates a torsion in portion 20d, also due the contrast reaction by surface 192 of dispenser 191, to obtain the inclination of angle A, as has been described with reference to FIG. 1.

Preferably, control means 500 can be programmed with laws of motions of first member 23, second member 24, third member 25 and fourth member 26, together with the timing occurrence of these laws of motion to accomplish bending shapes related to a variety of hairpin and undulated configurations.

Naturally, without prejudice to the principle of the invention, the embodiments and constructional details may be widely varied with respect to what has been described and illustrated, purely by way of a non-limiting example, without thereby departing from the scope of the invention as defined in the accompanying claims.

For example in the described embodiment, the first axis of rotation 17a is substantially aligned with the axis along which the electric conductor 300 is fed through dispenser 191. It will be evident to the skilled man that this characteristic is purely an example. In fact, in other embodiments of the present invention that have not been illustrated, the axis along which the electric conductor 300 is fed to be successively bent by one or more engagement members can be different from the first axis of rotation around which the first member is capable of rotating. In particular in the variations, the mentioned axis of feeding the electric conductor can be parallel to the first axis of rotation.

In further less preferred variations it is also foreseen to have the feeding axis of the electric conductor with an orientation that is not parallel to the first axis of rotation of the first member.

The invention claimed is:
1. An apparatus for manufacturing coil members for insertion in slots of a core of a dynamo electric machine comprising:
a first member rotating around a first axis of rotation;
a second member rotating around a second axis of rotation being positioned laterally with respect to the first axis of rotation, the second member being supported by the first member;
a third member rotating around a central axis of rotation of the second member, the third member being supported for rotation by the second member; and
at least a first engagement member being capable of engaging the conductor against a contrast surface to bend a portion of the conductor;
wherein rotations of the first member and of the second member cause the at least a first engagement member to move in a plane; and
wherein rotation of the third member causes the at least a first engagement member to rotate in the plane.
2. The apparatus of claim 1, further comprising:
a fourth member that rotates around a central axis of the second member, the fourth member being supported by the third member;
wherein rotation of the fourth member causes the at least a first engagement member to rotate out of the plane.
3. The apparatus of claim 1, further comprising means for feeding the conductor along the first axis and beyond the contrast surface.

4. The apparatus of claim 1, further comprising transmission means configured for transmitting rotation to the third member.
5. The apparatus of claim 4, wherein the transition means is located on the second axis of rotation in a passage of the first member.
6. The apparatus of claim 4, further comprising transmission means configured for transmitting rotation to the fourth member.
7. The apparatus of claim 6, wherein the transmission means is located on the second axis of rotation in a passage of the first member.
8. The apparatus of claim 1, further comprising:
first movement means for rotating the first member and engaging a portion of the first member, the portion of the first member being located on a periphery of the first member;
second movement means for rotating the second member; and
third movement means for rotating the third member and engaging a portion of the third member, the portion of the third member being located on a periphery of the third member.
9. The apparatus of claim 1, further comprising:
torsion means for engaging a first portion of the coil member; and
drive means comprising the third member for rotating the torsion means to apply a torsion deformation on a second portion of the coil member at the contrast surface.
10. The apparatus of claim 1, further comprising control means for synchronizing rotations of the first member, the second member and the third member according to a predetermined law of motion.
11. A method for manufacturing coil members for insertion in slots of a core of a dynamo electric machine comprising:
rotating a first member around a first axis of rotation;
rotating a second member around a second axis of rotation, the second axis of rotation being positioned laterally with respect to the first axis of rotation, and supporting the second member on the first member;
rotating a third member around a central axis of rotation of the second member; the third member being supported for rotation on the second member;
engaging the conductor against a contrast surface using the at least one engagement member to bend a portion of the conductor;
rotating the first member and the second member to cause the at least one engagement member to move in a plane; and
rotating the third member to cause the at least one engagement member to rotate in the plane.
12. The method of claim 11, further comprising:
rotating a fourth member around the first axis of rotation;
supporting the fourth member on the third member; and
rotating the fourth member to cause the at least one engagement member to rotate out of the plane.
13. The method of claim 12, further comprising transmitting rotation to the fourth member along the second axis of rotation.
14. The method of claim 11, further comprising feeding the conductor along the first axis and beyond the contrast surface.
15. The method of claim 11, further comprising transmitting rotation to the third member along the second axis of rotation.

16. The method of claim 11, further comprising:
engaging a first portion of the coil member; and
rotating the third member to apply a torsion deformation on a second portion of the coil member positioned at the contrast surface.

17. The method of claim 11, further comprising synchronizing rotations of the first member, the second member and the third member according to a predetermined law of motion.

\* \* \* \* \*